(12) United States Patent
Ren (10) Patent No.: US 11,489,717 B2
(45) Date of Patent: Nov. 1, 2022

(54) METHOD, APPARATUS, AND ELECTRONIC DEVICE FOR TRANSACTION LINK EXCEPTION HANDLING

(71) Applicant: ALIPAY (HANGZHOU) INFORMATION TECHNOLOGY CO., LTD., Zhejiang (CN)

(72) Inventor: Lingshu Ren, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/359,585

(22) Filed: Jun. 27, 2021

(65) Prior Publication Data

US 2022/0014420 A1 Jan. 13, 2022

(30) Foreign Application Priority Data

Jul. 8, 2020 (CN) .......................... 202010652057.5

(51) Int. Cl.
*H04L 41/069* (2022.01)
*H04L 41/0681* (2022.01)
(Continued)

(52) U.S. Cl.
CPC ........ *H04L 41/069* (2013.01); *H04L 41/0681* (2013.01); *H04L 43/087* (2013.01); *H04L 43/0882* (2013.01)

(58) Field of Classification Search
CPC . H04L 41/069; H04L 41/0681; H04L 43/087; H04L 43/0882; G06Q 20/40; G06Q 20/401
See application file for complete search history.

(56) References Cited

U.S. PATENT DOCUMENTS

| 6,885,641 | B1 * | 4/2005 | Chan ....................... H04L 43/50 370/252 |
| 7,587,363 | B2 | 9/2009 | Cataline et al. |

(Continued)

FOREIGN PATENT DOCUMENTS

| CN | 108833184 A | 11/2018 |
| CN | 109586946 A | 4/2019 |

(Continued)

OTHER PUBLICATIONS

First Search for Chinese Application No. 202010652057.5 dated May 12, 2022.

*Primary Examiner* — Joseph L Greene (57) ABSTRACT

The present application proposes disclose a method, an apparatus, and an electronic device for transaction communication link exception handling, which aims to make corresponding decisions (i.e., determine response actions) based on various influential factors and thereby improve the stability of a transaction communication link. Here, the method for transaction communication link exception handling comprises: obtaining transaction execution data of a transaction execution within a unit time on a transaction communication link between a first transaction computer node and a second transaction computer node; after detecting an exception in the transaction execution data, obtaining communication parameters and change records prior to the occurrence of the exception; then, determining, based on the communication parameters and change records, whether impact factors of the exception comprise communication situations and/or change actions; and finally, executing, based on a determination result, a corresponding response action for the transaction communication link.

17 Claims, 2 Drawing Sheets

(51) Int. Cl.
*H04L 43/087* (2022.01)
*H04L 43/0882* (2022.01)

(56) References Cited

U.S. PATENT DOCUMENTS

| | | | |
|---|---|---|---|
| 7,702,739 B1 | 4/2010 | Cheng et al. | |
| 8,161,330 B1* | 4/2012 | Vannatter | G07F 9/026 |
| | | | 714/48 |
| 8,196,122 B2 | 6/2012 | Mccrady et al. | |
| 8,694,347 B2 | 4/2014 | Kennis et al. | |
| 9,286,076 B2 | 3/2016 | Belmar et al. | |
| 9,959,531 B2 | 5/2018 | Purves et al. | |
| 9,990,618 B2 | 6/2018 | White et al. | |
| 10,725,763 B1* | 7/2020 | Chud | G06F 11/079 |
| 11,037,138 B2 | 6/2021 | Theurer et al. | |
| 2010/0218104 A1* | 8/2010 | Lewis | G06Q 10/06315 |
| | | | 715/736 |
| 2011/0010590 A1 | 1/2011 | Varadarajan | |
| 2012/0084400 A1* | 4/2012 | Almadi | H04L 67/12 |
| | | | 709/219 |
| 2014/0215061 A1* | 7/2014 | Meng | H04L 41/0896 |
| | | | 709/224 |
| 2015/0039868 A1 | 2/2015 | Belmar et al. | |
| 2015/0195157 A1* | 7/2015 | Nayyar | H04L 41/0681 |
| | | | 709/224 |
| 2015/0220914 A1 | 8/2015 | Purves et al. | |
| 2015/0332266 A1* | 11/2015 | Friedlander | G06Q 20/3274 |
| | | | 705/75 |
| 2020/0097933 A1 | 3/2020 | Walden et al. | |
| 2020/0104911 A1* | 4/2020 | Suvajac | G06N 7/005 |

FOREIGN PATENT DOCUMENTS

| | | |
|---|---|---|
| CN | 110223173 A | 9/2019 |
| CN | 110503551 A | 11/2019 |
| CN | 110516928 A | 11/2019 |
| WO | 2020087739 A1 | 5/2020 |
| WO | 2020233066 A1 | 11/2020 |

\* cited by examiner

METHOD, APPARATUS, AND ELECTRONIC DEVICE FOR TRANSACTION LINK EXCEPTION HANDLING

CROSS-REFERENCE TO RELATED APPLICATIONS

This application claims priority to Chinese Patent Application No. 202010652057.5, filed with the China National Intellectual Property Administration on Jul. 8, 2020. The entire content of the above-identified application is incorporated herein by reference.

TECHNICAL FIELD

The present application relates to the field of computer technologies, and specifically, to a method, an apparatus, and an electronic device for transaction communication link exception handling.

BACKGROUND

As online transactions become prevalent, it is increasingly important to ensure the stability of a transaction communication link for processing online transactions among various payment institutions. Related art usually performs threshold determination on a small number of parameters, such as the transaction failure rate of a transaction communication link, and when there is an exception on the transaction communication link, this transaction communication link is disconnected. However, there may be many causes behind the exception, and disconnecting the entire transaction communication link may lead to an incorrect decision. Especially in cases of relatively short monitoring periods (e.g., in seconds), data in the transaction communication link may experience "jitter," which can be easily determined to be an exception on the transaction communication link. As a result, the transaction communication link is disconnected, leading to relatively poor stability of the transaction communication link.

SUMMARY

The embodiments of the present application disclose a method, an apparatus, and an electronic device for transaction communication link exception handling, which aims to make corresponding decisions (i.e., determine response actions) based on various influential factors and thereby improve the stability of a transaction communication link.

In a first aspect, the embodiments of the present application disclose a method for transaction communication link exception handling, including: obtaining transaction execution data of a transaction execution within a unit time on a transaction communication link between a first transaction computer node and a second transaction computer node; detecting an exception in the transaction execution data; obtaining a plurality of communication parameters and a plurality of change records prior to an occurrence of the exception, wherein the plurality of communication parameters include data collected for one or more communication situations within the unit time at each communication collection point on the transaction communication link, and the plurality of change records include records of one or more change actions capable of impacting the transaction communication link within a first duration prior to the occurrence of the exception; determining, based on the plurality of communication parameters and the plurality of change records, whether one or more impact factors of the exception include at least one of: the one or more communication situations and the one or more change actions; and executing, based on a determination result, a response action corresponding to the transaction communication link.

In some embodiments, executing, based on a determination result, a response action corresponding to the transaction communication link further comprises: searching for a response action corresponding to the one or more impact factors; obtaining a record of the response action within a second duration prior to the occurrence of the exception; determining, based on the record of the response action, that the response action is not executed within the second duration prior to the occurrence of the exception; and executing the response action.

In some embodiments, the transaction execution data comprises at least one of: consumed transaction time of the transaction communication link, a transaction success rate of the transaction communication link, a transaction volume of the transaction communication link, and a transaction return code of the second transaction computer node.

In some embodiments, the one or more change actions comprise at least one of: a pressure test executed for the transaction communication link, wherein a corresponding response action includes canceling the pressure test if the one or more impact factors include the pressure test, and a communication change operation executed for the transaction communication link, wherein a corresponding response action includes rolling back a communication change operation if the one or more impact factors include the communication change operation.

In some embodiments, the transaction communication link includes a plurality of independent communication branch links, and the determining, whether the one or more impact factors of the exception include at least one of: the one or more communication situations and the one or more change actions, further comprises: determining, based on the communication parameters, whether the one or more impact factors include the occurrence of the exception within the unit time on one of the independent communication branch links, and in response to the one or more impact factors including the occurrence of the exception on one of the independent communication branch links, determining the response action from one of: disconnecting a corresponding independent communication branch link, or limiting traffic of the corresponding independent communication branch link.

In some embodiments, the method further comprises: in response to the one or more impact factors not including at least one of the one or more communication situations and the one or more change actions, determining the response action from one of: limiting traffic on the transaction communication link, disconnecting the transaction communication link, and canceling or limiting use of the transaction communication link at a client initiating the transaction, wherein the client corresponds to a server of the first transaction computer node.

In some embodiments, the detecting the exception in the transaction execution data comprises: determining a time period of the unit time in one cycle, wherein the cycle is divided into a plurality of time periods in advance; determining, based on the time period, a corresponding exception threshold range; and determining that the transaction execution data fall within the exception threshold range.

According to the method for transaction communication link exception handling provided by the embodiments of the present application, transaction execution data of a transaction execution within a unit time on a transaction communication link between a first transaction computer node and a second transaction computer node is obtained. After it is determined that an exception exists in the transaction execution data, communication parameters and change records prior to the occurrence of the exception are obtained. Then, whether impact factors of the exception include the communication situations and/or the change actions is determined based the communication parameters and the change records. Finally, a corresponding response action is executed for the transaction communication link according to a determination result. This method can solve the technical problem in the related art where there is only a single processing method when an exception occurs on a transaction communication link, and can execute corresponding response actions according to different impact factors, thereby improve the stability of the transaction communication link and achieve accurate and rapid responses to data of transaction execution of the transaction communication link obtained within a relatively short monitoring cycle.

In a second aspect, the embodiments of the present application provide an apparatus for transaction communication link exception handling, including: a first obtaining module configured to obtain transaction execution data of a transaction execution within a unit time on a transaction communication link between a first transaction computer node and a second transaction computer node; a confirming module configured to detect an exception in the transaction execution data; a second obtaining module configured to obtain a plurality of communication parameters and a plurality of change records prior to an occurrence of the exception, wherein the plurality of communication parameters include data collected for a communication situation within the unit time at each communication collection point on the transaction communication link, and the plurality of change records include records of a change action capable of impacting the transaction communication link within a first duration prior to the occurrence of the exception; a determining module configured to determine, based on the plurality of communication parameters and the plurality of change records, whether one or more impact factors of the exception include at least one of: the communication situation and the change action; and an executing module configured to execute, based on a determination result, a response action corresponding to the transaction communication link.

In some embodiments, the executing module includes: a searching unit configured to search for the response action corresponding to the one or more impact factors; an obtaining unit configured to obtain a record of the response action within a second duration prior to the occurrence of the exception; a first confirming unit configured to determine, based on the record of the response action, that the response action is not executed within the second duration prior to the occurrence of the exception; and an executing unit configured to execute the response action.

In some embodiments, the transaction execution data comprise at least one of: consumed transaction time of the transaction communication link; a transaction success rate of the transaction communication link; a transaction volume of the transaction communication link; and a transaction return code of the second transaction computer node.

In some embodiments, the change action comprises at least one of: a pressure test executed for the transaction communication link, wherein a corresponding response action includes canceling the pressure test if the one or more impact factors include the pressure test, and a communication change operation executed for the transaction communication link, wherein a corresponding response action includes rolling back the communication change operation if the one or more impact factors include the communication change operation.

In some embodiments, the transaction communication link includes a plurality of independent communication branch links, and the determining module includes a determining unit configured to: determine, based on the communication parameters, whether the one or more impact factors include an occurrence of the exception within the unit time on one of the independent communication branch links in the transaction communication link, and in response to the one or more impact factors including the occurrence of the exception on one of the independent communication branch links, determine the response action from one of: disconnecting a corresponding independent communication branch link or limiting traffic of the corresponding independent communication branch link.

In some embodiments, wherein the determining module includes a determining unit configured to: in response to the one or more impact factors not including at least one of: the one or more communication situations and the one or more change actions, determine the response action from one of: limiting traffic on the transaction communication link, disconnecting the transaction communication link, or canceling or limiting use of the transaction communication link at a client initiating the transaction, wherein the client corresponds to a server of the first transaction computer node.

In some embodiments, the confirming module comprises: a second confirming unit configured to determine a time period of the unit time in a cycle, wherein the cycle is divided into a plurality of time periods in advance; a third confirming unit configured to determine, based on the time period, a corresponding exception threshold range; and a fourth confirming unit configured to determine that the transaction execution data fall within the exception threshold range.

In a third aspect, the embodiments of the present application provide an electronic device, comprising at least one processor; and a memory storing instructions that, when executed by the at least one processor, cause the system to execute the method according to the first aspect.

In a fourth aspect, the embodiments of the present application provide a non-transitory computer-readable storage medium, which stores computer instructions, and the computer instructions cause the computer to execute the method according to the first aspect.

It is understood that the second aspect to the fourth aspect of the embodiments of the present application have consistent technical solutions as the first aspect of the embodiments of the present application. All aspects and corresponding feasible implementations achieve similar beneficial effects, which will not be elaborated.

BRIEF DESCRIPTION OF THE DRAWINGS

To more clearly describe the technical solutions of the embodiments of the present application, the drawings will be described below. It is understood that the drawings in the description below are merely some embodiments of the present application. People skilled in the art can obtain other drawings from these drawings without creative effort.

DETAILED DESCRIPTION OF THE INVENTION

In the following description, many details are provided to give a full understanding of this application. However, this application can be implemented in many other ways different from those described herein, and a person skilled in the art may make similar modifications without departing from the content of this application. Therefore, this application is not limited to the embodiments disclosed below.

Terms used in the embodiments of the present specification are only to describe specific embodiments but are not to limit the present application. The words "A," "the," and "said" in singular forms in the specification and appended claims are intended to include plural forms thereof, unless indicated clearly in the context.

Figure 1:
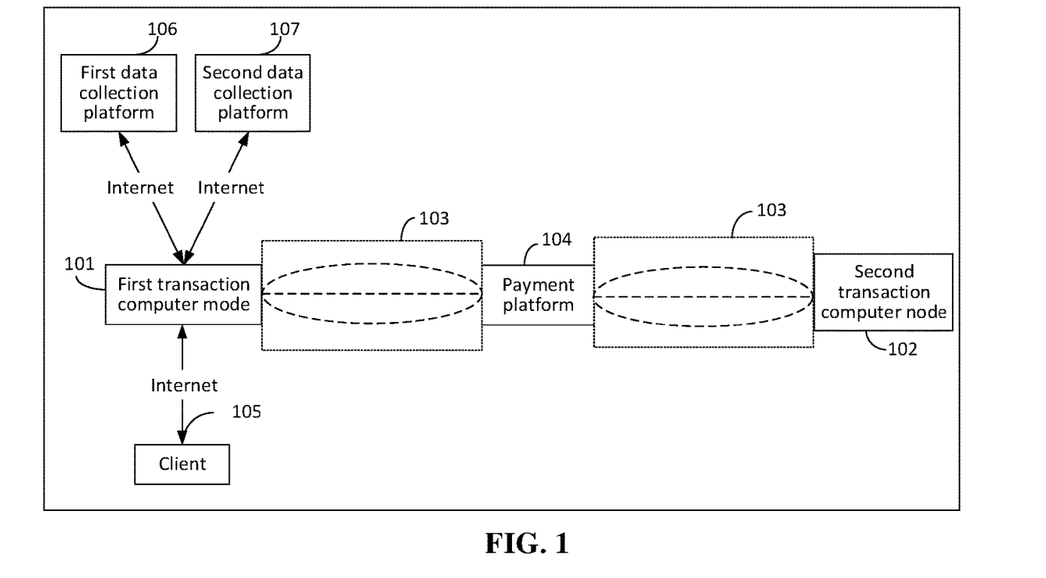
FIG. 1 illustrates a schematic diagram of an application scenario of a method for transaction communication link exception handling, in accordance with an embodiment of the disclosure.

FIG. 1 illustrates a schematic diagram of an application scenario of a method for transaction communication link exception handling, in accordance with an embodiment of the disclosure. The application scenario includes a first transaction computer node 101 and a second transaction computer node 102. A transaction computer node may be an electronic device of a payment institution that provides transaction services. The first transaction computer node 101 and the second transaction computer node 102 are electronic devices of different payment institutions.

For example, the first transaction computer node 101 may be a server of a first payment institution, and the second transaction computer node 102 may be a server of a second payment institution. The first payment institution may be a non-bank payment institution, and the second payment institution may be any bank. The first payment institution and the second payment institution may also be other institutions engaging in financial activities. This specification does not specifically limit the payment institutions. The example above is for illustration only.

Optionally, as shown in FIG. 1, on the transaction communication link 103 between the first transaction computer node 101 and the second transaction computer node 102, a payment platform 104 may be further included. For example, the payment platform 104 may be "Non-banking Institute Payment & Clearance of Net Union" or "China UnionPay", which are configured to connect transactions between non-bank payment institutions and banks.

The above transactions may be initiated by a client 105 in FIG. 1. The client 105 may be provided by the first payment institution (the payment institution corresponding to the first transaction computer node 101) and corresponds to a server of the first transaction computer node 101, which is configured to at least provide transaction services to the client 105.

For example, a user may click a shopping APP on a mobile phone and place an order with a merchant. After that, a payment process is initiated, the client 105 is called, and a service provided by the server of the first transaction computer node 101 is used via the client 105, the service being completing the transaction with the merchant via the second transaction computer node 102.

The method for transaction communication link exception handling provided by the embodiments of the present application may be implemented by the electronic device of the first transaction computer node 101.

The above electronic device includes at least one processor and at least one memory in connection with the processor. The memory stores program instructions executable by the processor. The processor calls the program instructions to execute the method for transaction communication link exception handling provided by the embodiments of the present application.

Figure 2:
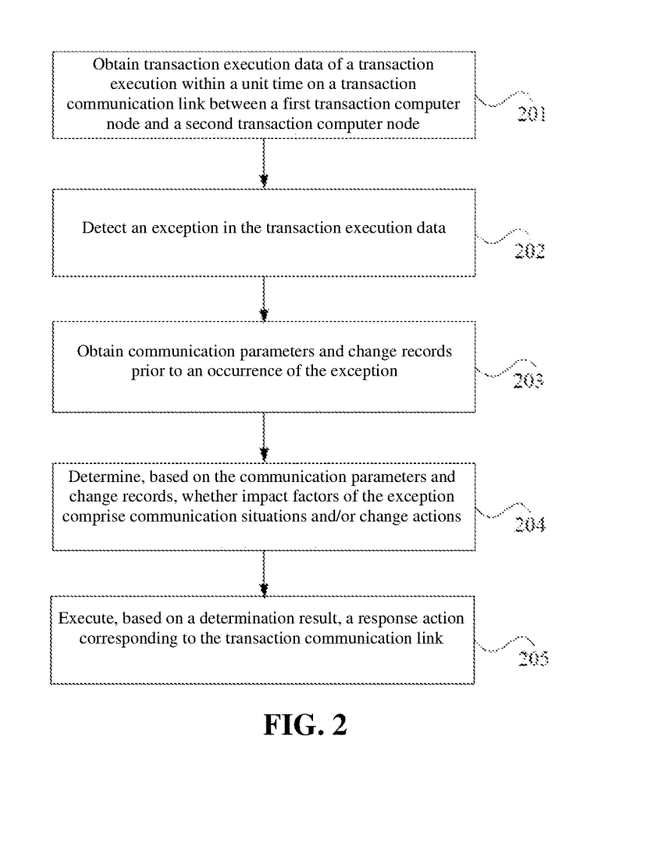
FIG. 2 illustrates a flow chart of a method for transaction communication link exception handling, in accordance with an embodiment of the disclosure.

FIG. 2 illustrates a flow chart of a method for transaction communication link exception handling, in accordance with an embodiment of the disclosure. The method for transaction communication link exception handling may include the following steps.

At Step 201, transaction execution data within a unit time of the transaction communication link 103 between the first transaction computer node 101 and the second transaction computer node 102 can be obtained.

The first transaction computer node 101 is a computer node in direct communication with a user. For example, the first transaction computer node 101 may be a server of a first payment institution. The first transaction computer node 101 is configured to notify the second transaction computer node 102 to complete a transaction between the user and a transaction object (e.g., a merchant).

The transaction communication link 103 between the first transaction computer node 101 and the second transaction computer node 102 is configured to transmit information of the above transaction. For example, the information may include bank accounts (i.e., account IDs registered at the second transaction computer node 102) of two parties of the transaction (i.e., the user and the transaction partner), a transaction amount, a transaction time, a digital signature generated by the user after inputting a payment password at the client 105 and used for bank verification, and the like, which are sent by a non-bank payment institution (i.e., the first transaction computer node 101) to a bank (i.e., the second transaction computer node 102). The information may also include payment information (e.g., a transaction serial number and the like) fed back by the second transaction computer node 102 after the transaction is completed.

The transaction execution data is obtained by monitoring the transaction execution of the transaction communication link 103 within a unit time.

The above unit time may be time in seconds, that is, the transaction execution data is obtained by monitoring the transaction execution every second. The source of the transaction execution data may be real-time data provided by other data collection platforms. As shown in FIG. 1, the data monitoring platform may include a first data collection platform 106 and a second data collection platform 107, and optionally, may further include other data collection platforms.

Optionally, the transaction execution data may be collected from only one data collection platform. If the communication with the data collection platform fails or there are problems in the transaction execution data (e.g., the transaction execution data exceeds a preset threshold range), the transaction execution data may be obtained by switching to another data collection platform, to ensure the stability of the data source. When one data source has problems, it is possible to switch to another data source to ensure normal executions of the method provided by the embodiments of the present application. It is also possible to simultaneously obtain data provided by multiple data collection platforms, then integrate and process the data to obtain the transaction execution data.

The transaction execution data may include: consumed transaction time of the transaction communication link, and/or a transaction success rate of the transaction communication link, and/or a transaction volume of the transaction communication link, and/or a transaction return code of the second transaction computer node 102.

The above transaction success rate may include a transaction failure rate per second and a transaction success rate per second. The transaction volume may be the number of transaction requests per second. The consumed transaction time of the transaction communication link, transaction success rate of the transaction communication link, and transaction volume of the transaction communication link may be obtained according to a daily transaction log of the first transaction computer node 101. The transaction return code may be data returned by the second transaction computer node 102. For example, for a bank, a transaction return code PS00098 indicates a system error, SGW21017 indicates an internal traffic limitation, and so on.

At Step 202, an exception in the transaction execution data can be detected.

Each type of transaction execution data has its corresponding exception detection rules. For example, an exception detection rule may be as follows: setting a normal threshold range; and when a type of the transaction execution data exceeds the normal threshold range, this type of transaction execution data is determined to have an exception. As another example, an exception detection rule may be setting an exception threshold range (equivalent to setting a normal threshold range). Many variations are possible. The embodiments of the present application have no limitations in this regard.

In some embodiments, when the transaction execution data include transaction return codes, and if the number of times that the transaction return code PS00098 (indicating a system error) appears exceeds a preset number of times within a second, an exception is detected.

In some embodiments, the threshold range of the transaction execution data may vary according to peaks and valleys of the transaction volume.

Step 202 may include the following steps.

At Step 2021, the unit time is determined to be within a time period in a cycle. Here, the cycle is divided into multiple time periods in advance. The division of the cycle may be based on historical transaction volume or may be done manually.

At Step 2022, based on the time period, a corresponding exception threshold range is determined. Each time period corresponds to a different exception threshold range. The exception threshold range may change during different time periods.

At Step 2023, it is determined that the transaction execution data fall within the exception threshold range. For example, assuming one day is a cycle, time periods close to breakfast, lunch, and dinner every day have peak transaction volume. According to historical transaction volumes, the transaction volumes are relatively high from 7 am to 9 am, from 11 am to 1 pm, and from 5 pm to 7 pm. During these time periods, the allowed number of transaction failures may be increased (equivalent to adjusting the exception threshold range) to adapt to high transaction volumes.

In some embodiments, adaptive exception threshold ranges may be set for all types of transaction execution data or only for some types of transaction execution data.

At Step 203, communication parameters and change records prior to an occurrence of the exception are obtained. The communication parameters are data collected for communications within the unit time at each communication collection point on the transaction communication link 103. For example, the communication parameters may be data collected within a second prior to the occurrence of the exception.

In some embodiments, the transaction communication link 103 may include multiple independent communication branch links, of which some may be dedicated lines. Each communication collection point may be set at the ends or in the middle of a communication branch link. Parameters collected from each communication collection point may include communication success rate, communication failure rate, etc. Optionally, the communication parameters may be data collected from the first data collection platform 106 and/or the second data collection platform 107.

The change records are records of change actions capable of impacting the transaction communication link within a first duration prior to the occurrence of the exception. The change actions may include: a pressure test executed for the transaction communication link 103. The pressure test may be executed by the first transaction computer node 101. The pressure test tests a transaction capacity and the like of the transaction communication link 103 and is used for testing whether the transaction communication link 103 can normally process transactions under a certain transaction volume.

The change actions may also include communication change operations executed for the transaction communication link 103, which may include a plurality of communication computer nodes, such as routers and gateways. The communication change operations may include one or more of: change operations, such as network changes, router changes, server changes, switch changes, and super network changes.

At Step 204, according to the communication parameters and change records, it is determined whether impact factors of the exception include the communication situations and/or the change actions. Step 204 may include: 1) determining, according to the communication parameters, whether impact factors of the exception include communication situations; 2) determining, according to the change records, whether impact factors of the exception include change actions.

When determining, based on the communication parameters, whether impact factors of the exception include communication situations, the communication parameters collected at each communication collection point may be compared with preset thresholds. If an exception exists, it is determined that the communication branch link where the communication collection point is located has communication failure. That is, the impact factors of the exception occurred to the transaction execution data may include the communication failure that occurred on this communication branch link.

When determining, based on the change records, whether impact factors of the exception include change actions, at first, the impact of the change actions in the change records on the type of the transaction execution data having the exception is eliminated, then it is determined whether the transaction execution data has any change. For example, a pressure test was being executed for the transaction communication link prior to the occurrence of the exception. It is determined, based on the change records, n transactions occurred within one second prior to the occurrence of the exception, and there were m transaction failures. After this portion of data is eliminated, it is determined whether the transaction failure rate changes. If the transaction failure rate changes, it is determined that the pressure test had impacts on the transaction execution data and is one of the impact factors of the exception.

At Step 205, according to a result of the determination whether impact factors of the exception include the communication situations and/or the change actions, a corresponding response action for the transaction communication link is executed.

If the impact factors include a pressure test, the corresponding response action includes canceling the pressure test.

If the impact factors include a communication change operation, the corresponding response action includes rolling back the communication change operation. The rollback refers to canceling the communication change operation and returning to a state prior to executing the communication change operation.

If the impact factors include a communication failure on any of the communication branch links, the response action includes disconnecting a corresponding independent communication branch link or limiting traffic of the corresponding independent communication branch link.

If the impact factors do not include communication situations or change actions, the response action may adopt one of: 1) limiting the traffic of the transaction communication link 103 (for example, reducing the transaction volume per second of the transaction communication link 103), to reduce the transaction handling pressure on the second transaction computer node 102; 2) disconnecting the entire transaction communication link 103; and 3) canceling or limiting the use of the transaction communication link 103 at the client 105 that initiates the transaction (for example, when the user initiates a payment at the client 105), displaying that a bank's transaction communication link 103 is busy, to guide the user to another transaction communication link.

In some embodiments, the method for transaction communication link exception handling includes: 1) obtaining transaction execution data of transaction execution within a unit time on a transaction communication link between a first transaction computer node and a second transaction computer node; 2) after determining that an exception exists in the transaction execution data, obtaining communication parameters and change records prior to the occurrence of the exception; 3) determining whether impact factors of the exception include the communication situations and/or the change actions based on the communication parameters and change records; and 4) based on a determination result, executing a corresponding response action for the transaction communication link. This method can solve the technical problem in the related art where there is only a single processing method when an exception occurs on a transaction communication link. This method can execute corresponding response actions according to different impact factors, thereby improve the stability of the transaction communication link, and achieve accurate and rapid responses to transaction execution data of the transaction communication link obtained within a relatively short monitoring cycle.

Specific embodiments of the present application are described above, and other embodiments not illustrated and described in the specification fall within the scope of the appended claims. In some cases, actions or steps set forth in the claims may be executed in an order different from those in the embodiments provided in the specification and may still achieve expected results. In addition, processes illustrated in the accompanying drawings may achieve expected results not necessarily by following the illustrated specific sequence or continuous sequence. In some embodiments, multi-task processing and parallel processing are also feasible or may be advantageous.

Figure 3:
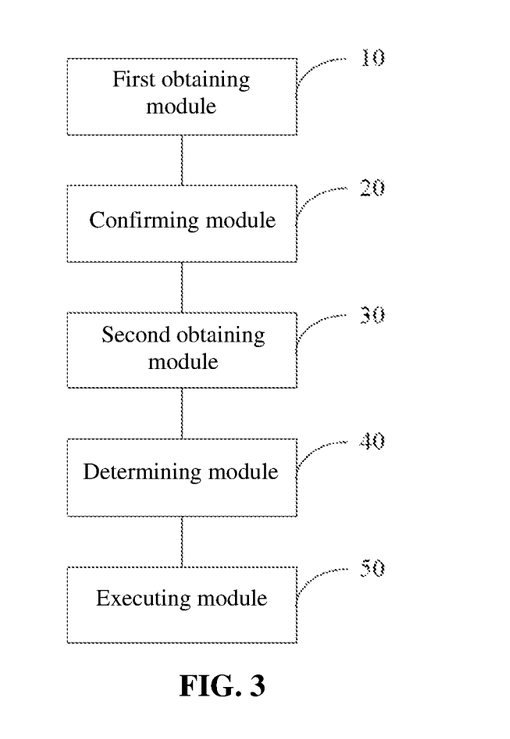
FIG. 3 illustrates a schematic structural diagram of an apparatus for transaction communication link exception handling, in accordance with an embodiment of the disclosure.

FIG. 3 illustrates a schematic structural diagram of an apparatus for transaction communication link exception handling, in accordance with an embodiment of the disclosure. As shown in FIG. 3, the apparatus for transaction communication link exception handling may include a first obtaining module 10, a confirming module 20, a second obtaining module 30, a determining module 40, and an executing module 50.

The first obtaining module is configured to obtain transaction execution data of a transaction execution within a unit time on a transaction communication link between a first transaction computer node and a second transaction computer node. The confirming module is configured to detect an exception in the transaction execution data. The second obtaining module is configured to obtain a plurality of communication parameters and a plurality of change records prior to the occurrence of the exception. The plurality of communication parameters include data collected for one or more communication situations within the unit time at each communication collection point on the transaction communication link, and the plurality of change records include records of one or more change actions capable of impacting the transaction communication link within a first duration prior to the occurrence of the exception. The determining module is configured to determine, based on the plurality of communication parameters and the plurality of change records, whether one or more impact factors of the exception include at least one of: the one or more communication situations and the one or more change actions. The executing module is configured to execute, based on a determination result, a response action corresponding to the transaction communication link.

In some embodiments, the executing module includes: a searching unit configured to search for a response action corresponding to the one or more impact factors; an obtaining unit configured to obtain a record of the response action within a second duration prior to the occurrence of the exception; a first confirming unit configured to determine, based on the record of the response action, that the response action is not executed within the second duration prior to the occurrence of the exception; and an executing unit configured to execute the response action.

In some embodiments, the transaction execution data comprise at least one of: consumed transaction time of the transaction communication link, a transaction success rate of the transaction communication link, a transaction volume of the transaction communication link, and a transaction return code of the second transaction computer node.

In some embodiments, the one or more change actions comprise at least one of: a pressure test executed for the transaction communication link, wherein a corresponding response action includes canceling the pressure test if the one or more impact factors include the pressure test, and a communication change operation executed for the transaction communication link, wherein a corresponding response action includes rolling back the communication change operation if the one or more impact factors include the communication change operation.

In some embodiments, the transaction communication link includes a plurality of independent communication branch links, and the determining module includes a determining unit configured to: determine, based on the plurality of communication parameters, whether the one or more impact factors include the occurrence of the exception within the unit time on one of the independent communication branch links, and in response to the one or more impact factors including the occurrence of the exception on one of the independent communication branch links, determine the response action from one of: disconnecting the corresponding independent communication branch link or limiting traffic of the corresponding independent communication branch link.

In some embodiments, the determining module includes a determining unit configured to: in response to the one or more impact factors not including at least one of: the one or more communication situations and the one or more change actions, determine the response action from one of: limiting traffic on the transaction communication link, disconnecting the transaction communication link, or canceling or limiting use of the transaction communication link at a client initiating the transaction, wherein the client corresponds to a server of the first transaction computer node.

In some embodiments, the confirming module comprises: a second confirming unit configured to determine a time period of the unit time in one cycle, wherein the cycle is divided into a plurality of time periods in advance; a third confirming unit configured to determine, based on the time period, a corresponding exception threshold range; and a fourth confirming unit configured to determine that the transaction execution data fall within the exception threshold range.

The apparatus for transaction communication link exception handling provided in the embodiment as shown in FIG. 3 can implement the technical solution of the method embodiment as shown in FIG. 2 of the present application, and relevant descriptions in the method embodiment may be further referenced to for the implementation principle and technical effects thereof.

Figure 4:
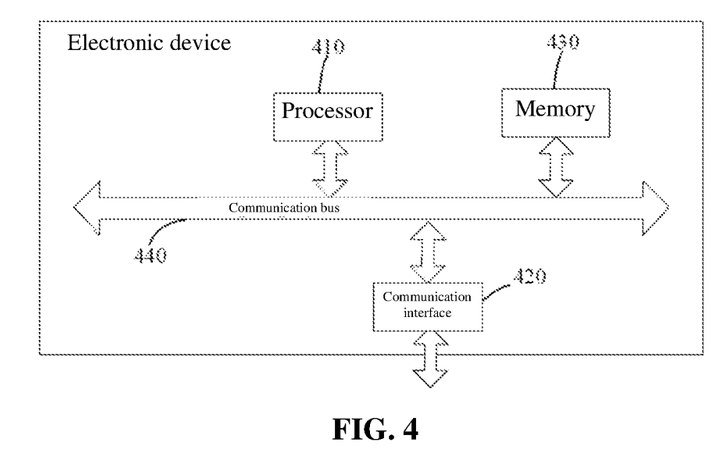
FIG. 4 illustrates a schematic structural diagram of an electronic device for transaction communication link exception handling, in accordance with an embodiment of the disclosure.

FIG. 4 is a schematic structural diagram of an embodiment of an electronic device according to the present application. As shown in FIG. 4, the electronic device may include at least one processor and at least one memory in communication connection with the processor, wherein the memory stores program instructions executable by the processor, and the processor calls the program instructions to execute the method for transaction communication link exception handling provided in the embodiment as shown in FIG. 2 of the embodiments of the present application.

FIG. 4 illustrates a block diagram of an exemplary electronic device applicable to implementing the embodiments of the present application. The electronic device in FIG. 4 is merely an example and shall impose no limitation to the functions and application scope of the embodiments of the present application.

As shown in FIG. 4, the electronic device is embodied in the form of a general computing device. Components of the electronic device may include, but are not limited to, one or more processors 410, a memory 430, and a communication bus 440 for connecting different system components (including the memory 430 and the processing unit 410).

The communication bus 440 represents one or more of several types of bus structures, including a memory bus or a memory controller, a peripheral bus, an Accelerated Graphics Port, a processor, or a local bus using any bus structure among a variety of bus structures. For example, these architectures include, but are not limited to, an Industry Standard Architecture (ISA) bus, a Micro Channel Architecture (MAC) bus, an enhanced ISA bus, a Video Electronics Standards Association (VESA) local bus, and a Peripheral Component Interconnection (PCI) bus.

The electronic device typically includes a variety of computer system readable media. These media may be any medium accessible by the electronic device, including volatile and non-volatile media and mobile and immobile media.

The memory 430 may include a computer system readable media in the form of volatile memory, such as a Random-Access Memory (RAM) and/or a cache. The electronic device may further include other mobile/immobile and volatile/non-volatile computer system storage media. The memory 430 may include at least one program product having one set (e.g., at least one) program module, and these program modules are configured to execute functions of various embodiments of the present application.

A program/practical tool having one set (at least one) program modules may be stored in the memory 430. Such program modules include, but are not limited to, an operating system, one or more application programs, other program modules, and program data. Each or a combination of these examples may include an implementation of a network environment. The program modules usually execute functions and/or methods in the embodiments as described in the embodiments of the present application.

By running a program stored in the memory 430, the processor 410 executes various functional applications and data processing, for example, implementing the method for transaction communication link exception handling provided in the embodiment as shown in FIG. 2 of the embodiments of the present application.

The embodiments of the present application provide a non-transitory computer-readable storage medium, which stores computer instructions, and the computer instructions cause the computer to execute the method for transaction communication link exception handling provided in the embodiment as shown in FIG. 2 of the embodiments of the present application.

The non-transitory computer-readable storage medium may adopt any combination of one or more computer-readable media. The computer-readable medium may be a computer-readable signal medium or a computer-readable storage medium. For example, the computer-readable storage medium may be, but is not limited to, an electric, magnetic, infrared, or semiconductor system, apparatus, or device, or a combination of the foregoing. More specific examples (a non-exhaustive list) of the computer-readable storage medium include: an electric connection having one or more wires, a portable computer disk, a hard disk, a random access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination of the foregoing. In this document, the computer-readable storage medium may be any tangible medium including or storing a program, and the program may be used by an instruction executing system, apparatus, or device or used in combination therewith.

The computer-readable signal medium may include data signals in a baseband or propagated as a portion of a carrier wave, wherein computer-readable program code is carried. Such propagated data signals may adopt a variety of forms, including but not limited to an electromagnetic signal, an optical signal, or any suitable combination of the foregoing.

The computer-readable signal medium may further be any computer-readable medium other than the computer-readable storage medium, and said computer-readable medium may send, propagate, or transmit a program used by an instruction executing system, apparatus, or device or used in combination therewith.

The program code included in the computer-readable medium may be transmitted using any appropriate medium, including but not limited to wireless, wired, optical fiber, RF, and the like, or any suitable combination of the foregoing.

The computer program code for executing operations of the embodiments of the present application may be compiled in one or more programming languages or a combination thereof. The programming languages include object-oriented programming language, such as Java, Smalltalk, and C++, and conventional procedural programming languages, such as the "C" language or similar programming languages. The program code may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider).

Specific embodiments of the present application are described above, and other embodiments not illustrated and described in the specification fall within the scope of the appended claims. In some cases, actions or steps set forth in the claims may be executed in an order different from those in the embodiments provided in the specification and may still achieve expected results. In addition, processes illustrated in the accompanying drawings may achieve expected results not necessarily by following the illustrated specific sequence or continuous sequence. In some embodiments, multi-task processing and parallel processing are also feasible or may be advantageous.

In the description of the embodiments of the present application, the description of reference terms "one embodiment," "some embodiments," "example," "specific example," or "some examples" should refer to including specific features, structures, materials, or characteristics described in combination with said embodiment or example in at least one embodiment or example of the embodiments of the present application. In the embodiments of the present application, the illustrative expression of the above-mentioned terms is not necessarily for the same embodiments or examples. In addition, the described specific features, structures, materials, or characteristics may be combined in a suitable manner in any one or more of embodiments or examples. Provided there is no contradiction, a person skilled in the art can join and combine different embodiments or examples and features of different embodiments or examples described in the embodiments of the present application.

Furthermore, terms "first" and "second" are merely used for the purpose of description and cannot be construed as indication or implication of relative importance or implicit indication of the number of indicated technical features. Therefore, a feature defined by "first" or "second" may explicitly or implicitly include at least one of the feature. In the description of the embodiments of the present application, "a plurality of" means at least two, for example, two, three, and the like, unless otherwise clearly defined.

Any process or method description described in the flow charts or in other manners herein may be construed as representing a module, a segment, or part of code including one or more executable instructions for implementing specified logical functions or processes, and preferred embodiments of the embodiments of the present application includes other implementations, wherein functions may be executed not in the illustrated or discussed sequence, including that the involved functions are executed substantially simultaneously or in an inverse sequence, which should be understood by those skilled in the art to which the present application belongs.

Depending on the context, the term "if" used herein may be interpreted as "when . . . " or "at the moment of . . . " or "in response to determination" or "in response to detection." Similarly, depending on the context, the phrase "if determined" or "if detecting (stated condition or event)" may be interpreted as "when determined" or "in response to determination" or "when detecting (stated condition or event)" or "in response to detecting (stated condition or event)."

It should be noted that the terminal involved in the embodiments of the present application may include, but is not limited to, a personal computer (PC), a personal digital assistant (PDA), a wireless handheld device, a tablet computer, a mobile phone, an MP3 player, and an MP4 player.

From several embodiments provided in the present application, it is understood that the disclosed system, apparatus, and method may be implemented in other manners. For example, the above-described apparatus embodiment is merely illustrative. For example, the division of units is merely a logical function division, and other manners of division may exist during practical implementations. For example, a plurality of units or components may be combined or integrated into another system, or some features may be omitted or not executed. Another point is that the illustrated or discussed mutual coupling or direct coupling or communication connection may be indirect coupling or communication connection through some interfaces, apparatuses, or units, which may be electrical, mechanical, or in other forms.

In addition, various functional units in various embodiments of the present application may be integrated into one processing unit, or various units may independently exist physically, or two or more units may be integrated into one unit. The above integrated unit may be implemented either in the form of hardware or in the form of hardware plus software functional units.

The above-described integrated unit implemented in the form of software functional units may be stored in a computer-readable storage medium. The above-described software functional units are stored in a storage medium, including several instructions to cause a computer device (which may be a personal computer, a server, or a network device) or a processor to execute steps of the method according to various embodiments of the present application. The above-described storage medium includes various media capable of storing program code, such as a flash drive, a portable hard disk, a Read-Only Memory (ROM), a Random-Access Memory (RAM), a magnetic disk, or an optical disc.

The description above are only preferred embodiments of the present application, which are not used to limit the present application. Any modifications, equivalent substitutions, and improvements made within the spirit and principle of the embodiments of the present application shall be encompassed by the protection scope of the present application.

What is claimed is:

1. A method for transaction communication link exception handling, comprising:
   determining a plurality of exception thresholds respectively for a plurality of time periods within a time cycle based on historical transaction volumes executed on a transaction communication link between a first transaction computer node and a second transaction computer node during historical time cycles, wherein an exception threshold corresponding to a time period with a peak transaction volume is higher than exception thresholds corresponding to other time periods with non-peak transaction volumes;
   monitoring execution of transactions every unit time on the transaction communication link to obtain transaction execution data, wherein the transaction execution data comprises a transaction failure rate within the unit time;
   determining one of the plurality of time periods from which the transaction execution data is obtained;
   detecting an exception based on one of the plurality of exception thresholds corresponding to the one time period and the transaction execution data;
   obtaining a plurality of change records prior to an occurrence of the exception, wherein
      the plurality of change records include records of one or more change actions applied to the transaction communication link within a first duration prior to the occurrence of the exception;
   determining whether the one or more change actions applied to the transaction communication link caused the exception, wherein the one or more change actions comprise running a test on the transaction communication link in real-time to test a transaction capacity of the transaction communication link; and
   executing, based on a determination result, a response action corresponding to the transaction communication link that cancels the test.

2. The method of claim 1, wherein executing, based on a determination result, the response action corresponding to the transaction communication link, further comprises:
   searching for the response action;
   obtaining a record of the response action within a second duration prior to the occurrence of the exception;
   determining, based on the record of the response action, that the response action is not executed within the second duration prior to the occurrence of the exception; and
   executing the response action.

3. The method of claim 1, wherein the transaction execution data further comprises at least one of:
   consumed transaction time of the transaction communication link, a transaction success rate of the transaction communication link, a transaction volume of the transaction communication link, and a transaction return code of the second transaction computer node.

4. The method of claim 1, further comprising:
   obtaining a plurality of communication parameters comprising data collected for one or more communication situations within the unit time at each communication collection point on the transaction communication link.

5. The method of claim 4, wherein
   the transaction communication link includes a plurality of independent communication branch links, and
   the method further comprises:
      determining whether the plurality of communication parameters caused the exception within the unit time on one of the plurality of independent communication branch links, and
      in response to determining that the plurality of communication parameters caused the exception on one of the plurality of independent communication branch links, determining the response action from one of:
         disconnecting a corresponding independent communication branch link, or
         limiting traffic of the corresponding independent communication branch link.

6. The method of claim 5, further comprises:
   in response to determining that the one or more communication situations and the one or more change actions did not cause the exception, determining the response action from one of:
      limiting traffic on the transaction communication link,
      disconnecting the transaction communication link, or
      canceling or limiting use of the transaction communication link at a client initiating the transaction, wherein the client corresponds to a server of the first transaction computer node.

7. An electronic device, comprising:
   at least one processor; and
   a memory storing instructions that, when executed by the at least one processor, cause the at least one processor to perform operations comprising:
      determining a plurality of exception thresholds respectively for a plurality of time periods within a time cycle based on historical transaction volumes executed on a transaction communication link between a first transaction computer node and a second transaction computer node during historical time cycles, wherein an exception threshold corresponding to a time period with a peak transaction volume is higher than exception thresholds corresponding to other time periods with non-peak transaction volumes;
      obtaining transaction execution data on the transaction communication link between the first transaction computer node and the second transaction computer node;
      determining one of the plurality of time periods from which the transaction execution data is obtained;
      detecting an exception based on one of the plurality of exception thresholds corresponding to the one time period and the transaction execution data;
      obtaining a plurality of change records prior to an occurrence of the exception, wherein the plurality of change records include records of one or more change actions applied to the transaction communication link within a first duration prior to the occurrence of the exception;
      determining whether the one or more change actions applied to the transaction communication link caused the exception, wherein the one or more change actions comprise running a test on the transaction communication link in real-time to test a transaction capacity of the transaction communication link; and
      executing, based on a determination result, a response action corresponding to the transaction communication link that cancels the test.

8. The electronic device of claim 7, wherein executing, based on a determination result, the response action corresponding to the transaction communication link, further comprises:
    searching for the response action;
    obtaining a record of the response action within a second duration prior to the occurrence of the exception;
    determining, based on the record of the response action, that the response action is not executed within the second duration prior to the occurrence of the exception; and
    executing the response action.

9. The electronic device of claim 7, wherein the transaction execution data comprises at least one of:
    consumed transaction time of the transaction communication link, a transaction success rate of the transaction communication link, a transaction volume of the transaction communication link, and a transaction return code of the second transaction computer node.

10. The electronic device of claim 7, wherein the operations further comprise:
    obtaining a plurality of communication parameters comprising data collected for one or more communication situations within a unit time at each communication collection point on the transaction communication link.

11. The electronic device of claim 10, wherein
    the transaction communication link includes a plurality of independent communication branch links, and
    the operations further comprise:
        determining whether the plurality of communication parameters caused the exception within the unit time on one of the plurality of independent communication branch links, and
        in response to determining that the plurality of communication parameters caused exception on one of the plurality of independent communication branch links, determining the response action from one of:
            disconnecting a corresponding independent communication branch link, or
            limiting traffic of the corresponding independent communication branch link.

12. The electronic device of claim 11, wherein the operations further comprise:
    in response to determining that—the one or more communication situations and the one or more change actions did not cause the exception, determining the response action from one of:
        limiting traffic on the transaction communication link,
        disconnecting the transaction communication link, or
        canceling or limiting use of the transaction communication link at a client initiating the transaction, wherein the client corresponds to a server of the first transaction computer node.

13. A non-transitory computer-readable storage medium including instructions that, when executed by at least one processor of a computing system, cause the computing system to perform operations comprising:
    determining a plurality of exception thresholds respectively for a plurality of time periods within a time cycle based on historical transaction volumes executed on a transaction communication link between a first transaction computer node and a second transaction computer node during historical time cycles, wherein an exception threshold corresponding to a time period with a peak transaction volume is higher than exception thresholds corresponding to other time periods with non-peak transaction volumes;
    obtaining transaction execution data on the transaction communication link between the first transaction computer node and the second transaction computer node;
    determining one of the plurality of time periods from which the transaction execution data is obtained;
    detecting an exception based on one of the plurality of exception thresholds corresponding to the one time period and the transaction execution data;
    obtaining a plurality of change records prior to an occurrence of the exception, wherein the plurality of change records include records of one or more change actions applied to the transaction communication link within a first duration prior to the occurrence of the exception;
    determining whether the one or more change actions applied to the transaction communication link caused the exception, wherein the one or more change actions comprise running a test on the transaction communication link in real-time to test a transaction capacity of the transaction communication link; and
    executing, based on a determination result, a response action corresponding to the transaction communication link that cancels the test.

14. The non-transitory computer-readable storage medium of claim 13, wherein executing, based on a determination result, the response action corresponding to the transaction communication link, further comprises:
    searching for the response action;
    obtaining a record of the response action within a second duration prior to the occurrence of the exception;
    determining, based on the record of the response action, that the response action is not executed within the second duration prior to the occurrence of the exception; and
    executing the response action.

15. The non-transitory computer-readable storage medium of claim 13, wherein the transaction execution data comprises at least one of:
    consumed transaction time of the transaction communication link, a transaction success rate of the transaction communication link, a transaction volume of the transaction communication link, and a transaction return code of the second transaction computer node.

16. The non-transitory computer-readable storage medium of claim 13, wherein
    the transaction communication link includes a plurality of independent communication branch links, and
    the operations further comprise:
        obtaining a plurality of communication parameters comprising data collected for one or more communication situations within a unit time at each communication collection point on the transaction communication link; and
        determining whether the plurality of communication parameters caused the exception within the unit time on one of the plurality of independent communication branch links, and
        in response to determining that the plurality of communication parameters caused the exception on one of the plurality of independent communication branch links, determining the response action from one of:
            disconnecting a corresponding independent communication branch link, or
            limiting traffic of the corresponding independent communication branch link.

17. The non-transitory computer-readable storage medium of claim 16, wherein the operations further comprise:
in response to determining that—the one or more communication situations and the one or more change actions did not cause the exception, determining the response action from one of:
limiting traffic on the transaction communication link,
disconnecting the transaction communication link, or
canceling or limiting use of the transaction communication link at a client initiating the transaction, wherein the client corresponds to a server of the first transaction computer node.

\* \* \* \* \*